O. F. MAYHEW.
COAL STOVE.
No. 91,857. Patented June 29, 1869.
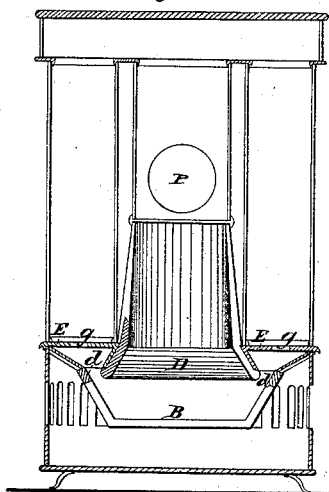
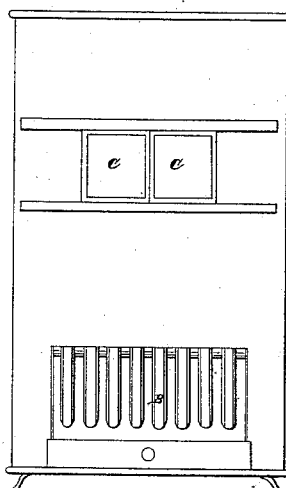
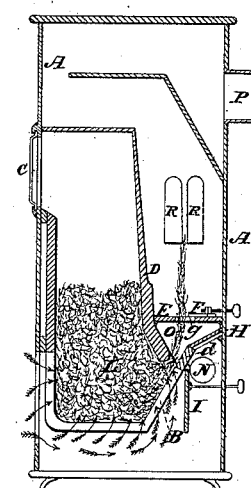
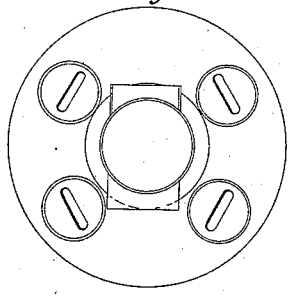
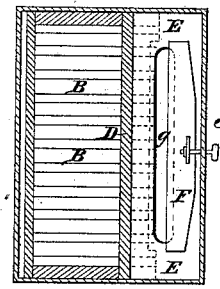
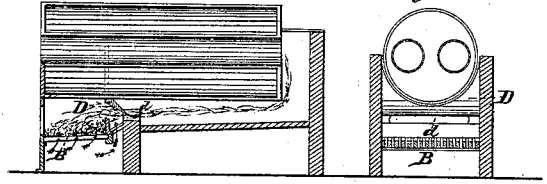
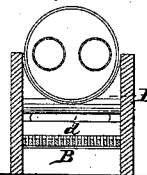
Witnesses:
Inventor:
O. F. Mayhew

United States Patent Office.

OSCAR F. MAYHEW, OF INDIANAPOLIS, INDIANA.

Letters Patent No. 91,857, dated June 29, 1869; antedated June 17, 1869.

COAL-STOVE.

The Schedule referred to in these Letters Patent and making part of the same.

*To all whom it may concern:*

Be it known that I, OSCAR F. MAYHEW, of Indianapolis, in the county of Marion, and State of Indiana, have invented new and useful Improvements in Stoves and Furnaces; and I do hereby declare that the following is a full, clear, and exact description thereof, reference being had to the accompanying drawing, making part of this specification.

My invention relates to commingling fresh air with the carbon and gases as they escape from the burning fuel in stoves, furnaces, and open fire-places, in a manner, and under conditions to effect a more thorough combination of the air with the carbon and gases, and hence a more complete combustion than heretofore.

Figure 1 is a front view of a stove with my improvements arranged therein.

Figure 2 is a vertical transverse section thereof.

Figure 3 is a horizontal section.

Figure 4 is a horizontal section of a corrugated back, which may be used in place of the plain back D, for the purpose hereinafter explained.

Figure 5 is a vertical section through the centre, and

Figure 6 is a horizontal section, just below the pipe P, of a round base-burning stove, in which air is supplied, and commingled and concentrated with the flame, (carbon and gases,) in the same manner as in the square stove, fig. 1.

Figures 7 and 8 represent a modification of essentially the same arrangement, applied to boiler-furnaces.

Other modifications of construction, in which fresh air is commingled and concentrated with the flame, (carbon and gases,) under the same conditions as herein set forth, may be applied to a great variety of heating and cooking-stoves and furnaces.

The arrangement of the several parts of a stove in which the carbon and gases are all concentrated near the hot coals as they escape from the fuel to the combustion-chamber, and the manner of supplying fresh air so as to be commingled and concentrated with them just as they escape from the fuel while in the condition of hot flame, in order to effect a more complete combination or combustion of the carbon and gases, will be readily understood from the drawings and the following description.

A is the external case of the stove.

B, the grate or fire-pot.

D, the back of the fuel-chamber or partition, separating the fuel from the combustion or radiating-chamber. This partition answers to the upper part of the cylindrical fuel-chamber above the grate or fire-pot B in the round stove, figs. 5 and 6.

$d$ is the contracted opening or throat, through which all the carbon and gases eliminated from the burning fuel must pass into the combustion or radiating-chamber.

The throat $d$ is situated at the bottom of the partition D, and the rear-inclined portion of the fire-pot or grate B is arranged with reference to the partition D or back of the fuel-chamber, so as to hold the burning fuel close to the throat $d$.

The carbon and gases are all drawn to, and concentrated at the throat $d$, and the inclined portion of the grate below and in front of the throat is made open, so as to admit fresh air to the flame (carbon and gases) just as it leaves the fuel L, and before it passes through the throat $d$, as indicated by the arrows at this part of the grate.

The rear inclined portion of the fire-pot, instead of being grate, may be a perforated plate for the admission of air to the flame, as above described; but I prefer the grate-bars as being more easily kept open, and more practicable for general use.

The flaring open grate or fire-pot of the cylindrical stove, figs. 5 and 6, is analogous to that of the rectangular stove, fig. 1, so far as supplying fresh air to the escaping carbon and gases is concerned.

H is a plate, which may be a continuation of the fire-pot B to the back or external case of the stove, and forming part of the bottom of the combustion-chamber.

In stoves where the volume of flame, after passing the throat $d$, is large and hot, and especially when the deflecting-plate E is used, the plate H may be perforated to admit an additional supply of air to the flame above the throat; but much air should not be admitted into the combustion-chamber above the throat, as, if the combustion-chamber is cooled by the admission of air to it, the combustion of the gases is less complete.

E is a deflecting-plate, placed above the throat $d$, provided with an opening, $g$, for the passage of the flame, and a slide or damper, F, to regulate the size of opening $g$.

This plate serves to prevent too rapid a dissipation or separation of the flame, and aids in the more complete combustion of the gases by retaining them longer near the hot coals.

The damper F may also be used to regulate the draught of the stove.

I is a swinging plate or damper, for shutting off or regulating the supply of air through the back part of the grate to the flame, and is chiefly used in starting up the fire by turning the draught through the fuel.

N are openings in the outer case A, for supplying air to the flame through the rear of the grate, so that the proper combustion of the escaping gases may continue after active combustion ceases in the body of the fuel when the air is shut off from the front and bottom of the grate.

These openings are provided with a shutter to regulate the admission of air.

C is the fuel-door.

Doors may also be hung to close the stove in front of the grate, though they are not shown in the drawing.

P is the exit-pipe connecting with the chimney.

L represents the fuel, and O the flame.

The back or partition D of the fuel-chamber may be corrugated on the fuel-side, as shown in fig. 4, which will prevent the coals packing close against it, and allow the gases eliminated in the fuel above to be drawn back along the corrugations to the throat d, and will also allow air to pass downward along them, when admitted at the fuel-door or otherwise, above the fuel, which will be commingled and concentrated with the flame and gases at the throat d, in the same manner as the air admitted through the grate below, and in front of the throat.

It will be seen that fresh air, supplied in the manner herein described, is brought in forcible contact with the flame and gases just as they leave the fuel, and issue through throat d, and acts upon them to excite a more thorough combustion as they pass away.

I make no claim to base-burning stoves, as such, nor to supplying air to the fuel or flame, except as herein described.

What I do claim is—

1. Supplying fresh air in a manner to be commingled and concentrated with the carbon and gases while in the condition of hot flame, as they escape from the fuel and pass through the throat d, when said throat is situated, in relation to the incandescent fuel, substantially as and for the purpose set forth.

2. The damper I, for shutting off or regulating the supply of air to the flame and gases between the fuel and throat d, substantially as and for the purpose set forth.

3. The deflecting-plate E, with its opening g, either with or without the damper F, in combination with the throat d, substantially as and for the purposes set forth.

OSCAR F. MAYHEW.

Witnesses:
   M. F. COLLIER,
   GEO. W. DUNN.